(12) United States Patent
Sugiyama et al.

(10) Patent No.: US 12,287,996 B2
(45) Date of Patent: Apr. 29, 2025

(54) INFORMATION PROCESSING APPARATUS, INFORMATION PROCESSING METHOD, AND NON-TRANSITORY COMPUTER READABLE MEDIUM

(71) Applicant: FUJIFILM Business Innovation Corp., Tokyo (JP)

(72) Inventors: Yuka Sugiyama, Kanagawa (JP); Naoto Yamasaki, Kanagawa (JP); Naohiro Sawata, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 370 days.

(21) Appl. No.: 17/699,161

(22) Filed: Mar. 20, 2022

(65) Prior Publication Data

US 2023/0086734 A1 Mar. 23, 2023

(30) Foreign Application Priority Data

Sep. 17, 2021 (JP) .................................. 2021-152570

(51) Int. Cl.
*G06F 3/12* (2006.01)
(52) U.S. Cl.
CPC .......... *G06F 3/1275* (2013.01); *G06F 3/1204* (2013.01); *G06F 3/126* (2013.01)
(58) Field of Classification Search
None
See application file for complete search history.

(56) References Cited

U.S. PATENT DOCUMENTS

2009/0268244 A1* 10/2009 Ataka ................ G03G 15/6582
358/1.15
2014/0376043 A1* 12/2014 Tsujita .................. G06F 3/1217
358/1.15

FOREIGN PATENT DOCUMENTS

JP H06161514 6/1994

* cited by examiner

*Primary Examiner* — Frantz Bataille
(74) *Attorney, Agent, or Firm* — JCIPRNET

(57) ABSTRACT

An information processing apparatus includes: a processor configured to: associate each of manufacturing processes of one of products with one of job elements each representing a detail of a job; and display the job elements in a schedule setting area of a screen, and in response to selection of one of the job elements, display displayed job elements that are included in the job elements and that represent respective jobs for manufacturing processes of an associated product that is one of the products and is a product of the manufacturing process associated with the selected job element, the displayed job elements being displayed in the schedule setting area in a form differentiated from a form for a job element associated with a manufacturing process of a different product that is included in the products and is different from the associated product.

19 Claims, 15 Drawing Sheets

FIG. 8

| 7/20 Shift | 7/21 Shift | |
|---|---|---|
| Load factor: 58.3%  Margin time: 3:20 | Load factor: 0%  Margin time: 8:00 | Load factor: 0% |

☑ Product A
Component A

□ Product A
Component B

□ Product B
Component C

□ Product B
Component D

Edit estimated required time
Cancel assignment
Issue printing instruction
Color product ›

FIG. 10

| Printing | | 33 | | | 34 |
|---|---|---|---|---|---|
| | Unassigned process | 7/20 Shift | 7/21 Shift | 7/22 Shift | 7/23 Shift |
| (Equipment/material group unassigned) | M1 | Load factor: 58.3%  Margin time: 3:20 | Load factor: 0%  Margin time: 8:00 | Load factor: 0%  Margin time: 8:00 | Load factor: 0%  Margin time: 8:00 |
| | | □ Product C<br>Component E | □ Product A<br>Component A  ←35<br><br>□ Product A<br>Component B<br><br>□ Product B<br>Component C<br><br>□ Product B<br>Component D | | | |
| (Equipment/material group unassigned) | M2 | Load factor: 58.3%  Margin time: 3:20 | Load factor: 0%  Margin time: 8:00 | Load factor: 0%  Margin time: 8:00 | Load factor: 0%  Margin time: 8:00 |
| | | | □ Product B<br>Component F<br><br>□ Product C<br>Component G | | |
| (Equipment/material group unassigned) | M3 | Load factor: 58.3%  Margin time: 3:20 | Load factor: 0%  Margin time: 8:00 | Load factor: 0%  Margin time: 8:00 | Load factor: 0%  Margin time: 8:00 |
| (Equipment/material group unassigned) | M4 | Load factor: 58.3%  Margin time: 3:20 | Load factor: 0%  Margin time: 8:00 | Load factor: 0%  Margin time: 8:00 | Load factor: 0%  Margin time: 8:00 |

| Finishing | | | | | |
|---|---|---|---|---|---|
| | Unassigned process | 7/20 Shift | 7/21 Shift | 7/22 Shift | 7/23 Shift |
| (Equipment/material group unassigned) | M5 | Load factor: 58.3%  Margin time: 3:20 | Load factor: 0%  Margin time: 8:00 | Load factor: 0%  Margin time: 8:00 | Load factor: 0%  Margin time: 8:00 |
| | | | □ Product A<br>Binding<br><br>□ Product B<br>Coating | | |
| (Equipment/material group unassigned) | M6 | Load factor: 58.3%  Margin time: 3:20 | Load factor: 0%  Margin time: 8:00 | Load factor: 0%  Margin time: 8:00 | Load factor: 0%  Margin time: 8:00 |

| Schedule | Equipment/material & shift | Equipment/material & time | All ▽ | ←—31 |

| Start editing | Displayed period Start [<] 📅 07/16/2021 [>] Display scale [4 days ▽] Current time 🔎 ——▯—— 🔍 | ←—32 |
| Printing | | |

| | Unassigned process —33 | 7/20 Shift | 7/21 Shift | 7/22 Shift ←—34 |
|---|---|---|---|---|
| (Equipment/material group unassigned) M1 | | Load factor: 58.3%  Margin time: 3:20 | Load factor: 0%  Margin time: 8:00 | Load factor: 0%  Margin time: 8:00 |
| | ☐ Product C<br>Component E | ☐ Product A<br>Component A  ←—35<br><br>☐ Product A<br>Component B<br><br>☐ Product B<br>Component C<br><br>☐ Product B<br>Component D | | |
| (Equipment/material group unassigned) M2 | | Load factor: 58.3%  Margin time: 3:20 | Load factor: 0%  Margin time: 8:00 | Load factor: 0%  Margin time: 8:00 |
| | | ☐ Product B<br>Component F<br><br>☐ Product C<br>Component G | | |
| (Equipment/material group unassigned) M3 | | Load factor: 58.3%  Margin time: 3:20 | Load factor: 0%  Margin time: 8:00 | Load factor: 0%  Margin time: 8:00 |

FIG. 13

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2021-152570 filed Sep. 17, 2021.

BACKGROUND

(i) Technical Field

The present disclosure relates to an information processing apparatus, an information processing method, and a non-transitory computer readable medium.

(ii) Related Art

Japanese Unexamined Patent Application Publication No. 6-161514 discloses a production management system for managing a production system that is provided with one or more workstations where an object is processed in each of processes and that manufactures products in lots via the workstations for the processes. The production management system includes a memory, a display device, a first display controller, a second display controller, a plan change input unit, and a plan change controller. The memory stores job plan data generated in advance. The job plan data is composed of at least the combination of a process code for distinguishing the process, a workstation code for distinguishing the workstation, a lot code for distinguishing the lot, and date data representing a date and time when a job is performed. The display device is capable of displaying a workstation load state and a lot process state on the screen. The first display controller reads out job plan data related to a specified workstation from the job plan data stored in the memory and causes the display device to display the workstation load state representing blocks each for a date and time when a job associated with the lot code related to the specified workstation is to be performed. The blocks are represented with one axis representing date and the other representing load by using time. The second display controller causes the display device to display the lot process state on the basis of the job plan data stored in the memory. The lot process state is composed of a date and time when a job associated with the specified lot code is to be performed, a process, and a workstation list. The plan change input unit specifies a date block to be moved and a location as a moving destination in the workstation load state displayed on the display device. The plan change controller replaces, in the memory, at least date data in the job plan data corresponding to the date block specified by the plan change input unit with the date data represented by the specified location. The first display controller corrects the displaying of the workstation load state by moving the date block specified by the plan change input unit to the specified location. In response to the replacement of the job plan data in the memory, the second display controller corrects the displaying of the lot process state in accordance with the content of the data replacement.

SUMMARY

In factories where products are made to order, manufacturing is managed for each product in accordance with a workflow representing the flow of manufacturing processes from order to shipping.

To set a job schedule for a product, a person in charge is thus required to comprehend a workflow specified for the product and then to set the schedule according to the workflow.

Aspects of non-limiting embodiments of the present disclosure relate to an information processing apparatus, an information processing method, and a non-transitory computer readable medium by which in accordance with the flow of manufacturing processes specified on a product basis, a user may set a schedule for jobs in the manufacturing processes without verifying a workflow chart representing the flow of the manufacturing processes.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including: a processor configured to: associate each of manufacturing processes of one of products with one of job elements each representing a detail of a job; and display the job elements in a schedule setting area of a screen, and in response to selection of one of the job elements, display displayed job elements that are included in the job elements and that represent respective jobs for manufacturing processes of an associated product that is one of the products and is a product of the manufacturing process associated with the selected job element, the displayed job elements being displayed in the schedule setting area in a form differentiated from a form for a job element associated with a manufacturing process of a different product that is included in the products and is different from the associated product.

BRIEF DESCRIPTION OF THE DRAWINGS

An exemplary embodiment of the present disclosure will be described in detail based on the following figures, wherein:

FIG. 8 is a view illustrating an example of job card highlighting using a pop-up menu;

FIG. 10 is a view illustrating an example of displaying all of highlighted job cards;

FIG. 11 is a view illustrating a reduced display example of a schedule table;

FIG. 12 is a view illustrating an enlarged display example of the schedule table;

FIG. 13 is a view illustrating an example of displaying the schedule table in automatic scale setting;

DETAILED DESCRIPTION

Figure 1:
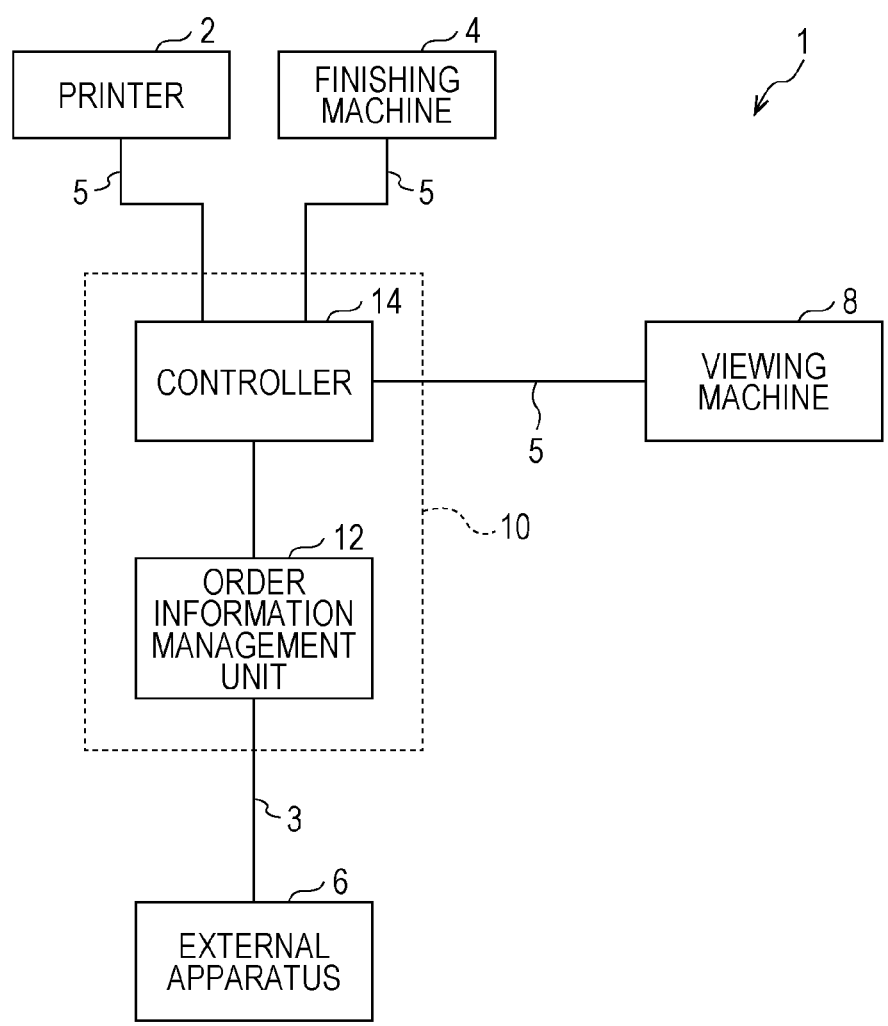
FIG. 1 is a view illustrating an example configuration of a process management system.

Hereinafter, an exemplary embodiment will be described with reference to the drawings. The same components and the same steps are denoted by the same reference numerals throughout the drawings, and description thereof is not repeated.

FIG. 1 is a view illustrating an example configuration of a process management system 1 that receives order information regarding a product from an external apparatus 6 and manages manufacturing processes of the product according to the received order information. The type of the product regarding which the order information is managed in the process management system 1 is not limited, and order information regarding any type of product may be managed; however, an example of managing order information regarding a printed material such as a book, a brochure, or a flier is hereinafter used to describe the process management system 1.

The process management system 1 is employed in a factory where a product is made to order from a customer (in the example in this exemplary embodiment, a printing factory where printed materials are made). As illustrated in FIG. 1, the process management system 1 includes a printer 2, a finishing machine 4, a viewing machine 8, and a process management apparatus 10.

The process management apparatus 10 is connected to, via a communication network 3, for example, the external apparatus 6 installed outside the printing factory and is also connected, via a communication network 5, to the printer 2, the finishing machine 4, and the viewing machine 8 that are installed in the printing factory.

The communication network 3 is a communication network such as the Internet to which a large number of unspecific apparatuses are connected. The communication network 5 is a communication network to which apparatuses permitted in advance are connected, such as a corporate local area network (LAN) built up in the printing factory. The connection form of the communication network 3 and the communication network 5 is not limited and may be any of a wired network, a wireless network, and the combination of a wired network and the wireless network.

The process management apparatus 10 includes an order information management unit 12 and a controller 14 and acquires order information regarding the printed material from the external apparatus 6.

The order information management unit 12 stores the order information acquired from the external apparatus 6 in a memory device and manages the order information in a centralized manner.

In accordance with the order information provided for each of printed materials managed by the order information management unit 12, the controller 14 generates information indicating the flow of manufacturing processes (hereinafter, referred to as a workflow) of the ordered printed material and job cards 35 each representing details of a job for each manufacturing process (see FIG. 3).

The manufacturing processes of the printed material include, for example, manufacturing processes required to be performed from an order for a printed material to shipping such as a printing process for printing characters and images on the paper sheets, a finishing process for making a paper sheet uneven (called embossing), a binding process for binding printed paper sheets, and a delivery process for delivering a finished printed material to a place specified in the order information. Note that the above-described manufacturing processes of the printed material are examples, and the manufacturing processes of the printed material include a manufacturing process required to make the ordered printed material. The manufacturing processes of the printed material thus vary on occasions, depending on the ordered printed material.

Each job card 35 is an example of a job element generated for each manufacturing process of the printed material and includes, for example, an identification for distinguishing a printed material to be made and an identification for distinguishing a component to be made in the manufacturing process. The component denotes a component of the printed material. For example, if the printed material is a book, the printed material is roughly composed of a cover and text. The separately manufacturable printed material component such as the cover or the text is referred to as a component of the printed material. In other words, the job card 35 is information card representing the details of a job for each manufacturing process of the ordered printed material.

In contrast, the viewing machine 8 is used to set a job schedule for the ordered printed material in the following manner. A process manager (hereinafter, referred to as a user) who sets a job schedule in accordance with the flow of the manufacturing processes of the ordered printed material operates the viewing machine 8 and assigns a job for each manufacturing process of the ordered printed material to a manufacturing facility such as the printer 2 or the finishing machine 4. Specifically, the user performs an operation for assigning a job card 35 to a manufacturing facility by using the viewing machine 8 and thereby sets the job schedule for the ordered printed material.

The viewing machine 8 thus requests the process management apparatus 10 to display a schedule setting screen 7 (see FIG. 3), in accordance with the operation by the user. The schedule setting screen 7 is used to set the schedule for a job in the manufacturing process of the ordered printed material.

In response to receiving the request for displaying the schedule setting screen 7, the controller 14 of the process management apparatus 10 performs control to generate screen data regarding the schedule setting screen 7 including the job cards 35 in each manufacturing process of the ordered printed material and then transmit the screen data to the viewing machine 8. The schedule setting screen 7 is thereby displayed by the viewing machine 8. The displaying of the schedule setting screen 7 by the controller 14 thus denotes, for example, performing the control to generate the screen data regarding the schedule setting screen 7 and then transmit the screen data to the viewing machine 8. Even if the user is present in a remote place where the user is not touch the process management apparatus 10, transmitting the screen data regarding the schedule setting screen 7 to the viewing machine 8 causes the user to set the schedule.

The controller 14 also transmits reservation data according to the job schedule set on the schedule setting screen 7 by the user to the printer 2 or the finishing machine 4 assigned the job card 35, via the communication network 5. More than one printer 2 and more than one finishing machine 4 may be present. It goes without saying that the manufacturing facility serving as a transmission destination of the reservation data may include a manufacturing facility other than the printer 2 and the finishing machine 4, such as an inspection device that inspects the printed material.

The process management apparatus 10 in the process management system 1 that performs the steps as described above is configured by using, for example, a computer 20.

Figure 2:
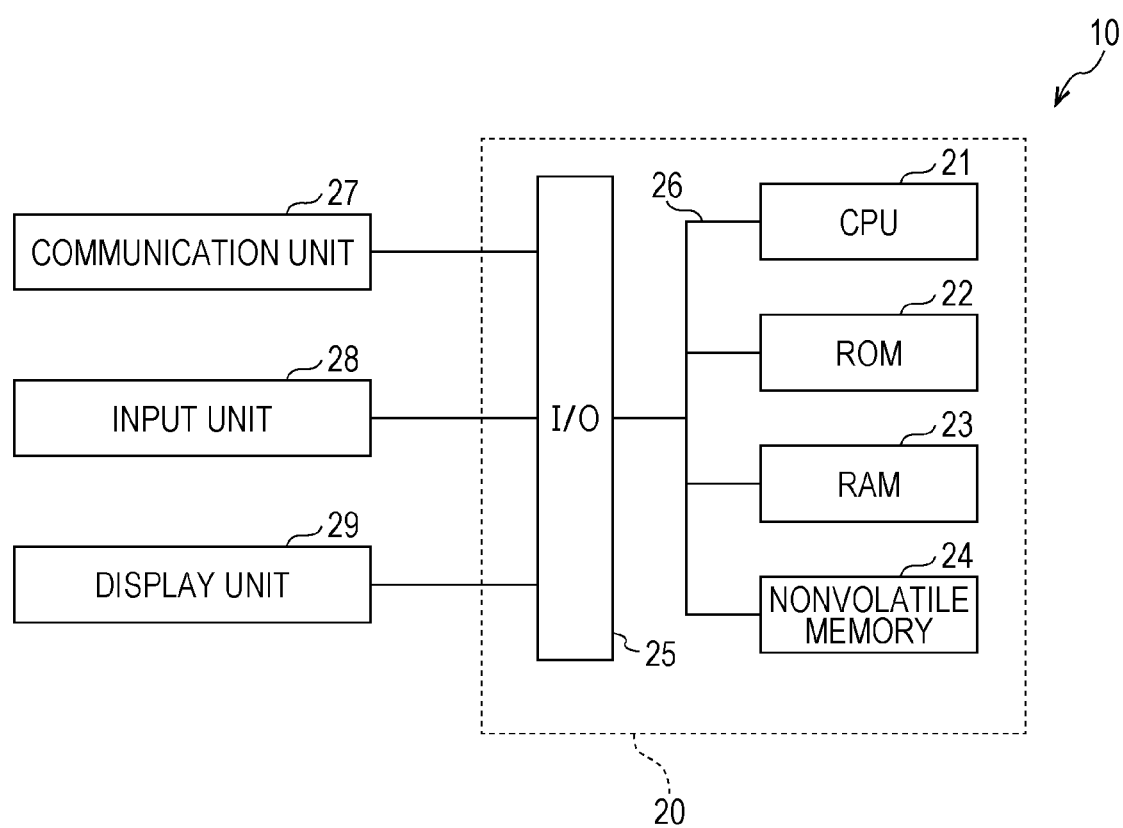
FIG. 2 is a view illustrating an example configuration of an electrical system in a process management apparatus.

FIG. 2 is a view illustrating an example configuration of an electrical system in the process management apparatus 10 configured by using the computer 20.

The computer 20 includes a central processing unit (CPU) 21 serving as an example of a processor configured to implement the functions of the order information management unit 12 and the controller 14 illustrated in FIG. 1, a read only memory (ROM) 22 storing an information processing program causing the computer 20 to function as the process management apparatus 10, a random access memory (RAM) 23 used as a temporary work area of the CPU 21, a nonvolatile memory 24, and an input/output interface (I/O) 25. The CPU 21, the ROM 22, the RAM 23, the nonvolatile memory 24, and the I/O 25 are connected to each other via a bus 26.

The nonvolatile memory 24 is an example of a memory device in which information stored therein is kept even though power supplied to the nonvolatile memory 24 is disconnected. For example, a semiconductor memory is used therefor, but a hard disk may be used. The nonvolatile memory 24 stores a parameter such as connection destination information (for example, an IP address) regarding the printer 2, the finishing machine 4, the external apparatus 6, or the viewing machine 8 each of which is connected to the process management apparatus 10, for example, via a corresponding one of the communication network 3 and the communication network 5.

In contrast, the I/O 25 is connected to, for example, a communication unit 27, an input unit 28, and a display unit 29.

The communication unit 27 is connected to the communication network 3 and the communication network 5 and has a communication protocol for performing data communication with the printer 2, the finishing machine 4, the external apparatus 6, and the viewing machine 8.

The input unit 28 is a device that receives an instruction from an operator of the process management apparatus 10 and notifies the CPU 21 of the instruction. For example, a button, a touch panel, a keyboard, a pointing device, a mouse, and other devices are used therefore.

The display unit 29 is a device that displays information processed by the CPU 21. For example, a liquid crystal display, and an organic electro luminescence (EL) display are used therefore.

The computer 20 may be configured by using cloud computing. In this case, the computer 20 is remotely controlled, for example, from the viewing machine 8 via the communication network 5. Accordingly, the computer 20 does not necessarily require the input unit 28 and the display unit 29.

The schedule setting screen 7 displayed on the viewing machine 8 by the process management apparatus 10 will then be described.

Figure 3:
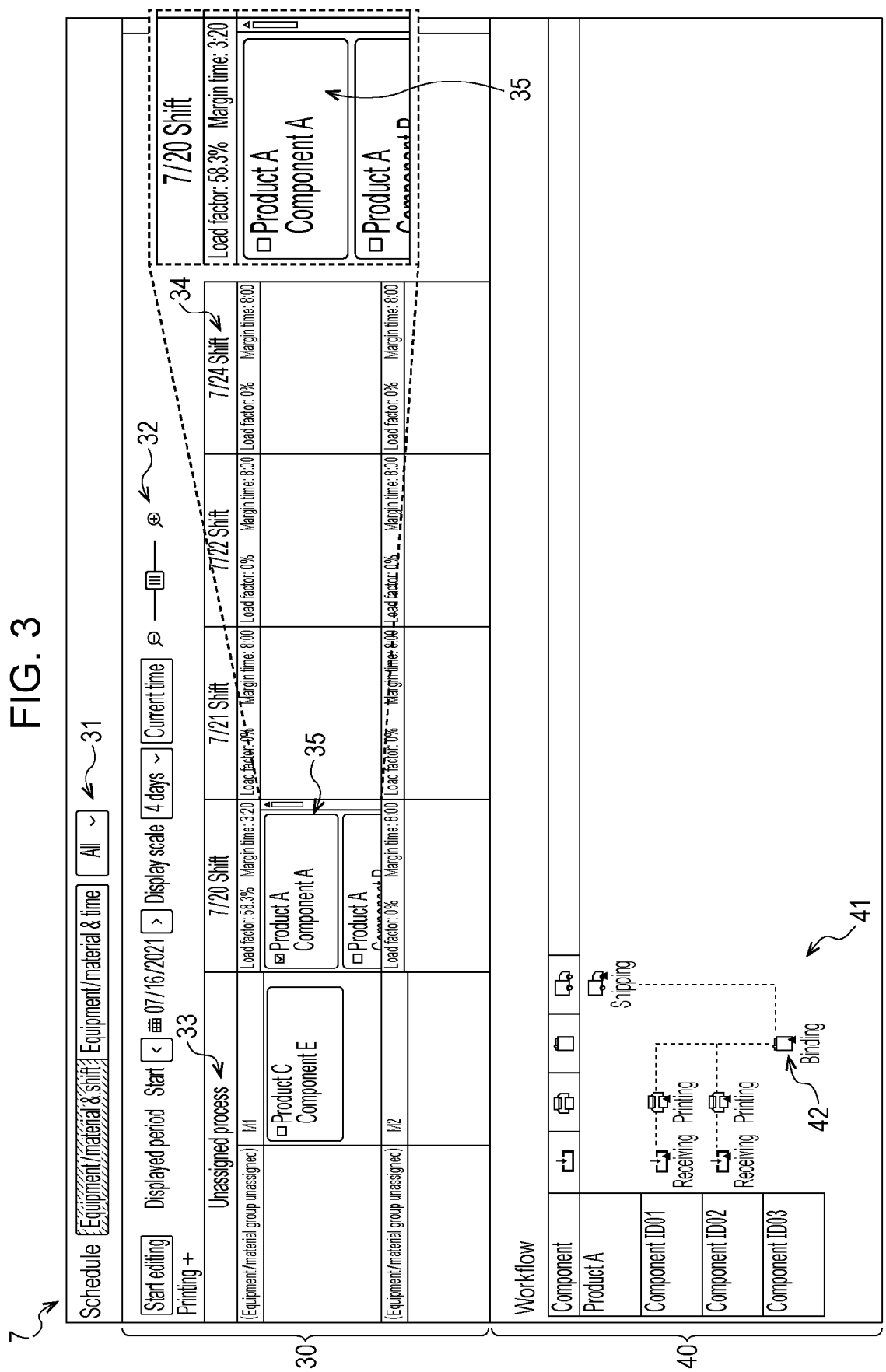
FIG. 3 is a view illustrating an example of a schedule setting screen.

FIG. 3 is a view illustrating an example of the schedule setting screen 7. The schedule setting screen 7 includes a schedule setting area 30, a display selection area 31, a menu area 32, and a workflow display area 40.

The schedule setting area 30 is an area where the user sets a job schedule for each ordered printed material.

The display selection area 31 is an area where the user selects a display style of a job schedule to be set on the schedule setting screen 7 for each ordered printed material.

The menu area 32 is an area where the display style of the content of the display on the schedule setting screen 7 is set in accordance with a display form selected in the display selection area 31. Specifically, in the menu area 32, a date and time range for setting the job schedule, that is, a displayed period in a calendar 34 and an enlargement/reduction ratio, that is, a scale of characters and figures displayed in the schedule setting area 30 and the workflow display area 40 are set.

The workflow display area 40 is an area for displaying a workflow chart 41 representing the workflow of the ordered printed material.

The schedule setting screen 7 illustrated in FIG. 3 represents an example of the schedule setting screen 7 on which the Equipment/material & shift button is selected in the display selection area 31. When the Equipment/material & shift button is selected, an assignable job card 35 and the calendar 34 are displayed for each manufacturing facility on the schedule setting screen 7. The assignable job card 35 is displayed in the column of an unassigned process 33. When the user drags a job card 35 displayed in the column of the unassigned process 33 and drops the job card 35 into one of dates displayed in the calendar 34, a job represented by the dropped job card 35 is assigned to a date corresponding to the drop position of the job card 35.

If the date intended to be assigned the job has already been assigned a different job represented by a different one of the job cards 35, the job to be newly assigned is assigned to a time frame subsequent to the time frame of the already assigned different job. In this case, as illustrated in FIG. 3, the job card 35 representing the newly assigned job is displayed below the job card 35 representing the already assigned different job in the same date field in the calendar 34. That is, the schedule setting area 30 is designed to see the order of the jobs from the display locations of the respective job cards 35 in the calendar 34.

After the job is assigned to the manufacturing facility, the process management apparatus 10 updates a load factor and a margin time of each of the dates for the manufacturing facility assigned the job, on the basis of information associated with the job card 35 representing the details of the assigned job. The job card 35 is thus associated in advance with working hours required to perform the job represented by the job card 35 for each manufacturing facility allowed to be assigned the job. The process management apparatus 10 updates the load factor and the margin time on the basis of the working hours associated with the job card 35 assigned to the manufacturing facility and hours of operation allowed per day of the manufacturing facility. Note that the job card 35 is also associated with details of order information, such as the delivery date of the ordered printed material, the orderer of the printed material, and the number of copies printed. Hereinafter, all of the details displayed in the schedule setting area 30 are collectively referred to as a schedule table.

For example, if the user selects a job card 35 on the schedule setting screen 7, the workflow chart 41 representing the workflow of the printed material associated with the selected job card 35 is displayed in the workflow display area 40. The workflow display area 40 does not have to be displayed in advance on the schedule setting screen 7. For example, at the beginning of displaying the schedule setting screen 7, the process management apparatus 10 displays only the schedule setting area 30 without displaying the workflow display area 40 on the schedule setting screen 7. If the user selects a job card 35 on the schedule setting screen 7, the process management apparatus 10 may display the workflow display area 40 on the schedule setting screen 7 together with the workflow chart 41 for the printed material associated with the selected job card 35.

In the workflow chart 41, one or more icons 42 represented by respective figures of, for example, the job details are displayed for each manufacturing process, and the flow of the manufacturing processes of the printed material, that is, the order of the manufacturing processes of the printed material is represented by using a line connecting the icons 42. Each icon 42 is accompanied by a character string such as Printing or Binding representing the job details of the manufacturing process.

The phrase "the user selects a job card 35" denotes that the user moves the cursor to a job card 35, for example, with the mouse and then left-clicks the job card 35.

Highlighting on Schedule Setting Screen

Figure 4:
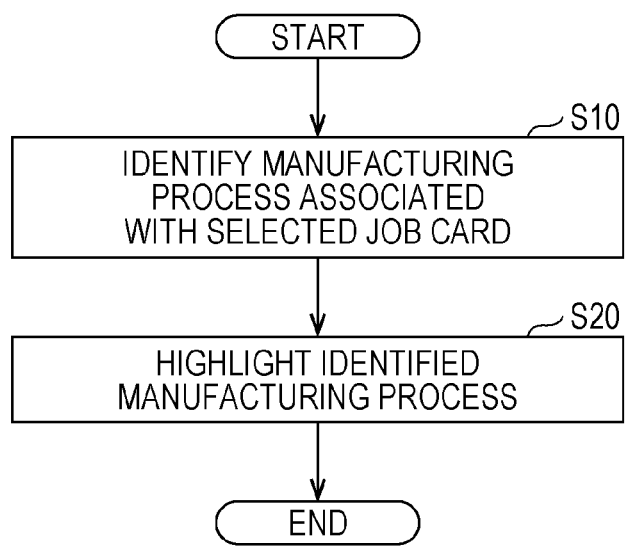
FIG. 4 is a flowchart illustrating an example flow of displaying steps performed in a case where a job card is selected.

Actions of the process management apparatus 10 will then be described. FIG. 4 is a flowchart illustrating an example flow of displaying steps performed by the CPU 21 when the user one of the job cards 35 on the schedule setting screen 7. The information processing program in which the displaying steps are described is stored in advance, for example, in the ROM 22 of the process management apparatus 10. The CPU 21 of the process management apparatus 10 reads the information processing program stored in the ROM 22 and performs the displaying steps.

In step S10 in FIG. 4, the CPU 21 acquires a workflow of a printed material from the nonvolatile memory 24. The printed material is associated with the selected job card 35. The CPU 21 refers to the acquired workflow and identifies a manufacturing process of a component associated with the selected job card 35.

In step S20, the CPU 21 displays the workflow chart 41 in the workflow display area 40 in such a manner that the display form of the manufacturing process identified in step S10 is differentiated from the display form of manufacturing processes other than the manufacturing process of the printed material associated with the selected job card 35. The displaying steps illustrated in FIG. 4 is then terminated.

Note that highlighting denotes displaying a specific piece of information of pieces of information of the same type in a display form differentiated from the display form of a piece of information other than the specific piece of information.

Figure 5:
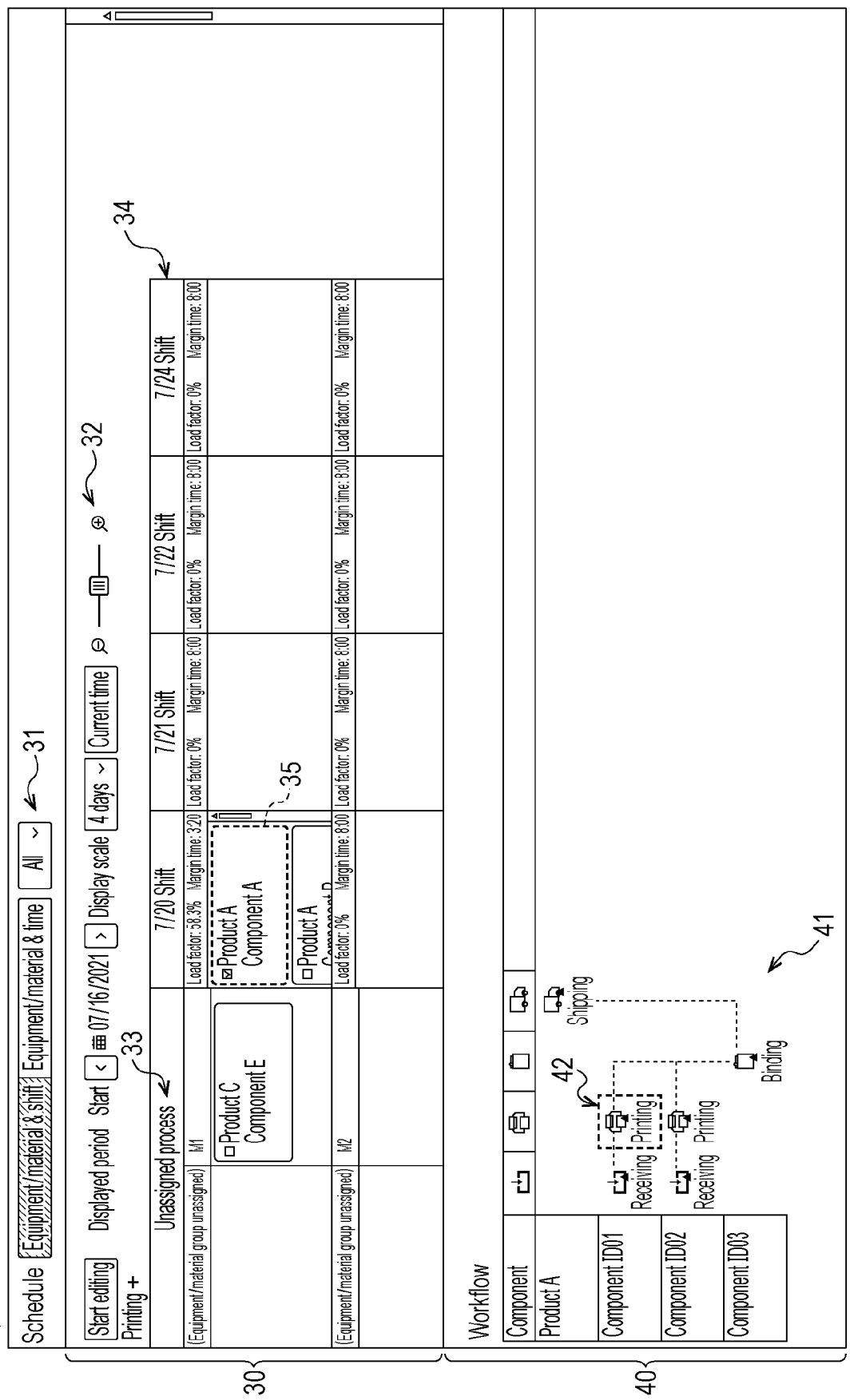
FIG. 5 is a view illustrating an example of highlighting a manufacturing process.

FIG. 5 is a view illustrating an example of highlighting the manufacturing process of the component associated with the selected job card 35. In FIG. 5, the job card 35 represented by using a dotted line is the job card 35 selected by the user. After the user selects the job card 35, the CPU 21 displays, in the workflow display area 40, the workflow chart 41 including an icon 42 that represents the manufacturing process of the component associated with, for example, the job card 35 and that is surrounded by a dotted line. The highlighting in which the icon 42 is surrounded by the dotted line is an example. As long as a display form enables the user to know the manufacturing process of the component associated with the job card 35 in the manufacturing processes of the printed material, any display form may be used, as a matter of course. For example, the CPU 21 may highlight the icon 42 in such a manner that, for example, the color, the background color, or the size of the icon 42 is differentiated from those of the other icons 42. Alternatively, the CPU 21 may blink the icon 42 intended to be highlighted.

Correspondence of a job to be assigned to a manufacturing facility by using a job card 35 with the component and the manufacturing process that are associated with the job in the workflow of the ordered printed material is visually represented in the schedule setting area 30 and the workflow display area 40.

Note that for the operation step in FIG. 4, the example in which the user selects one job card 35 has been described; however, the user may select multiple job cards 35. In this case, each manufacturing process of the component associated with the corresponding job card 35 is highlighted in the workflow display area 40.

For the displaying steps illustrated in FIG. 4, correspondence of the job represented by the selected job card 35 with the job associated with the manufacturing process in the workflow of the printed material associated with the selected job card 35 has been described. However, the CPU 21 may perform the steps in opposite correspondence.

Figure 6:
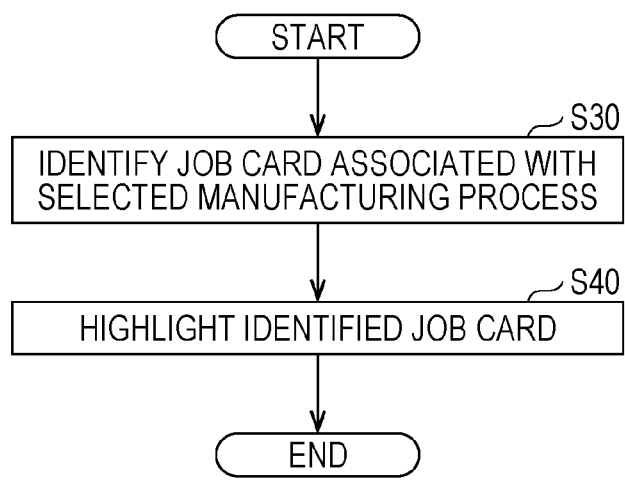
FIG. 6 is a flowchart illustrating an example flow of displaying steps performed in a case where an icon representing a manufacturing process is selected.

FIG. 6 is a flowchart illustrating an example flow of displaying steps performed by the CPU 21 when the user selects one of the icons 42 each representing a manufacturing process of a component of an ordered printed material in the workflow chart 41.

In step S30 in FIG. 6, the CPU 21 refers to the job cards 35 associated with the manufacturing processes of a printed material, the manufacturing processes being displayed in the workflow chart 41 in the workflow display area 40. The CPU 21 identifies a job card 35 associated with the manufacturing process represented by the selected icon 42.

In step S40, the CPU 21 displays the job card 35 identified in step S30 in the schedule setting area 30 in a form differentiated from a form for the other job cards 35 associated with the manufacturing processes other than the selected manufacturing process and then terminates the displaying steps illustrated in FIG. 6.

In highlighting the job card 35, the CPU 21 may cause the workflow display area 40 not to be displayed on the schedule setting screen 7 in accordance with an instruction from the user. Not displaying the workflow display area 40 on the schedule setting screen 7 causes the schedule setting area 30 to be displayed in a larger area than in the case where the workflow display area 40 is displayed on the schedule setting screen 7. The schedule setting using the job card 35 in the schedule setting area 30 is thus performed easier and the set schedule table may be easier to see than in the case where the workflow display area 40 is displayed on the schedule setting screen 7.

Examples of highlighting the job card 35 include display forms in which the line type or the thickness of the border of the job card 35, at least one of the background color, the character color, and the border color of the job card 35 is changed, the shape of the job card 35 is changed, and the job card 35 blinks; however, it goes without saying that any display form distinguishable from those of the other job cards 35 may be used.

Correspondence of the job associated with the selected manufacturing process with the manufacturing facility where and the time when the job is to be performed is represented visually in the schedule setting area 30 and the workflow display area 40.

For the operation step in FIG. 6, the example where the user selects one of the icons 42 has been described; however, the user may select multiple icons 42 from the workflow chart 41. In this case, job cards 35 associated with the manufacturing processes respectively represented by the selected icons 42 are highlighted in the schedule setting area 30. Together with each job card 35, the assignment state of the job represented by the job card 35, such as the manufacturing facility assigned the job card 35 and a date in the calendar 34 may also be highlighted.

Another example of displaying based on a relationship between the job card 35 and the workflow of the printed material will then be descried.

Figure 7:
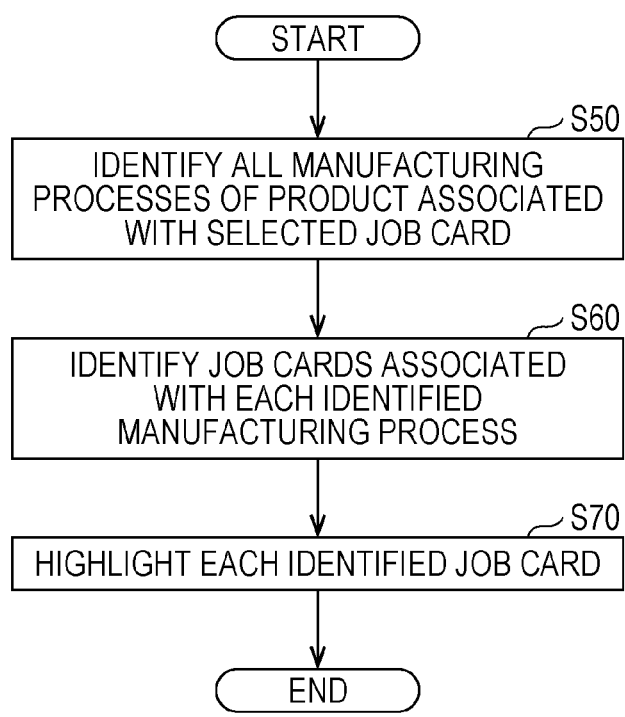
FIG. 7 is a flowchart illustrating an example flow of the displaying steps performed in a case where a job card is selected.

FIG. 7 is a flowchart illustrating an example flow of displaying steps performed by the CPU 21 when the user selects one of the job cards 35 on the schedule setting screen 7.

In step S50 in FIG. 7, the CPU 21 acquires, from the nonvolatile memory 24, a workflow of the printed material associated with the selected job card 35. The CPU 21 refers to the acquired workflow and thereby identifies all of manufacturing processes included in the workflow.

In step S60, the CPU 21 identifies job cards 35 associated with each manufacturing process identified in step S50.

In step S70, the CPU 21 displays each job card 35 identified in step S60 in the schedule setting area 30 in a display form differentiated from a display form for job cards 35 associated with printed materials different from the printed material associated with the selected job card 35. The CPU 21 then terminates the displaying steps illustrated in FIG. 7.

Only the job cards 35 for the printed material associated with the job card 35 selected by the user from among the job cards 35 for the multiple printed materials displayed in the schedule setting area 30 are thereby highlighted. The schedule for the manufacturing processes of the printed material associated with the selected job card 35 is thus displayed by using the job cards 35 displayed at the respective positions in the schedule setting area 30.

The CPU 21 highlights all the job cards 35 associated with the manufacturing processes of the printed material associated with the job card 35 selected by the user in the displaying steps illustrated in FIG. 7; however, the job cards 35 to be highlighted by the CPU 21 are not limited to these job cards 35. For example, in the workflow of the printed material associated with the selected job card 35, the CPU 21 may highlight a job card 35 associated with the manufacturing process to be performed immediately before the manufacturing process associated with the job card 35 selected by the user, a job card 35 associated with the manufacturing process to be performed immediately after the manufacturing process associated with the job card 35 selected by the user, and the job card 35 selected by the user. Hereinafter, the job card 35 associated with the manufacturing process to be performed immediately before the manufacturing process associated with the job card 35 selected by the user and the job card 35 associated with the manufacturing process to be performed immediately after the manufacturing process associated with the job card 35 selected by the user are each referred to as an adjacent job card 35. In addition, the manufacturing process to be performed immediately before the manufacturing process associated with the job card 35 selected by the user is referred to as a previous process, and the manufacturing process to be performed immediately after the manufacturing process associated with the job card 35 selected by the user is referred to as a subsequent process.

In the workflow of the printed material associated with the job card 35 selected by the user, the CPU 21 may also highlight a job card 35 associated with at least one of a manufacturing process being performed for the component associated with the selected job card 35 and a manufacturing process scheduled next.

A highlight setting for specifying a job card 35 to be highlighted in response to the selection of a job card 35 is selected, for example, by the user.

A job card 35 is also highlighted from a pop-up menu 36 displayed, for example, after the user moves the cursor to the job card 35 with the mouse and right-clicks on the job card 35.

FIG. 8 is a view illustrating an example of the pop-up menu 36. The pop-up menu 36 has, for example, items "Edit estimated required time" for setting working hours required for the job represented by the job card 35, "Cancel assignment" for cancelling the job assigned to the manufacturing facility, "Issue printing instruction" for outputting an instruction given by an orderer for the job represented by the job card 35, and "Color product" for highlighting the job card 35.

The user selects one of colors in the color pallet displayed in response to the selection of the item "Color product" from the pop-up menu 36. The CPU 21 colors the highlight target job card 35 with the selected color in accordance with the highlight setting set in advance.

Figure 9:
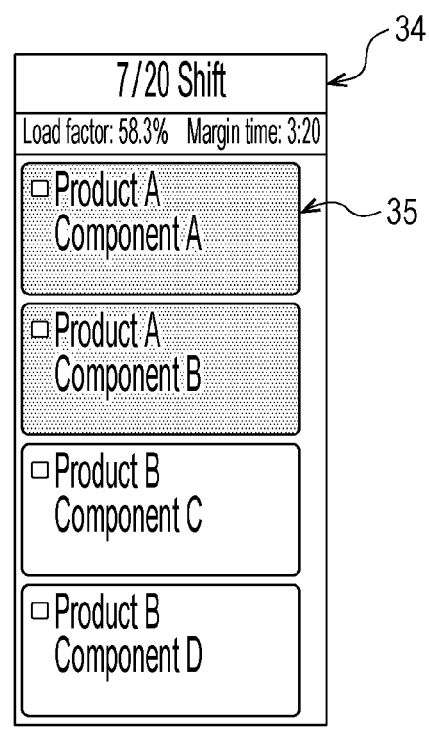
FIG. 9 is a view illustrating an example of the highlighted job card.

FIG. 9 is a view illustrating an example of colored job cards 35. If the highlight setting is set as in the displaying steps illustrated in FIG. 7, all of the job cards 35 associated with the manufacturing processes of the printed material associated with the job card 35 for which the user selects a color from the pop-up menu 36 are colored with the color selected by the user, as illustrated in FIG. 10.

As has been described, the coloring of the job card 35 is an example of highlighting of the job card 35.

Enlarging/Reducing on Schedule Setting Screen

The CPU 21 enlarges or reduces the schedule table displayed in the schedule setting area 30 on the basis of a scale set in the menu area 32 by the user. Specifically, the CPU 21 enlarges the schedule table as the scale is set larger, and reduces the schedule table as the scale is set smaller.

Figure 11:
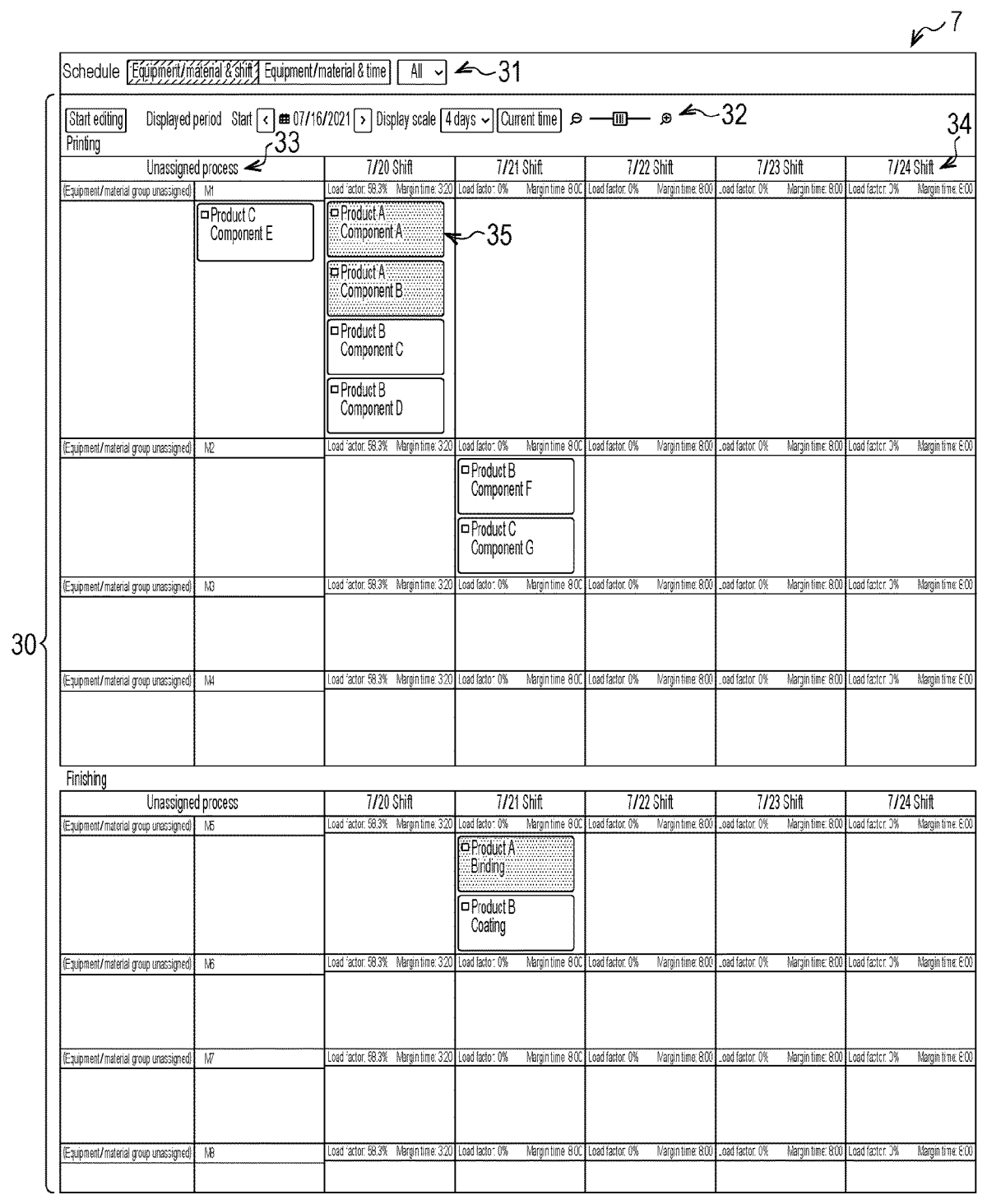

FIG. 11 is a view illustrating a reduced display example of the schedule table displayed in the schedule setting area 30 illustrated in FIG. 10. Reducing the schedule table causes all of the highlighted job cards 35 to be displayed within the schedule setting area 30 without the user scrolling the schedule setting area 30. The user may thus verify the entire schedule table for the ordered printed material.

FIG. 12 is a view illustrating an enlarged display example of the schedule table displayed in the schedule setting area 30 illustrated in FIG. 10. Enlarging the schedule table makes it easier to see various pieces of information displayed in the job card 35 and the calendar 34.

The CPU 21 may autonomously set the scale for the schedule table to display each highlighted job card 35 in the maximum size in the schedule setting area 30. The way of setting the scale is referred to as automatic scale setting.

Figure 13:
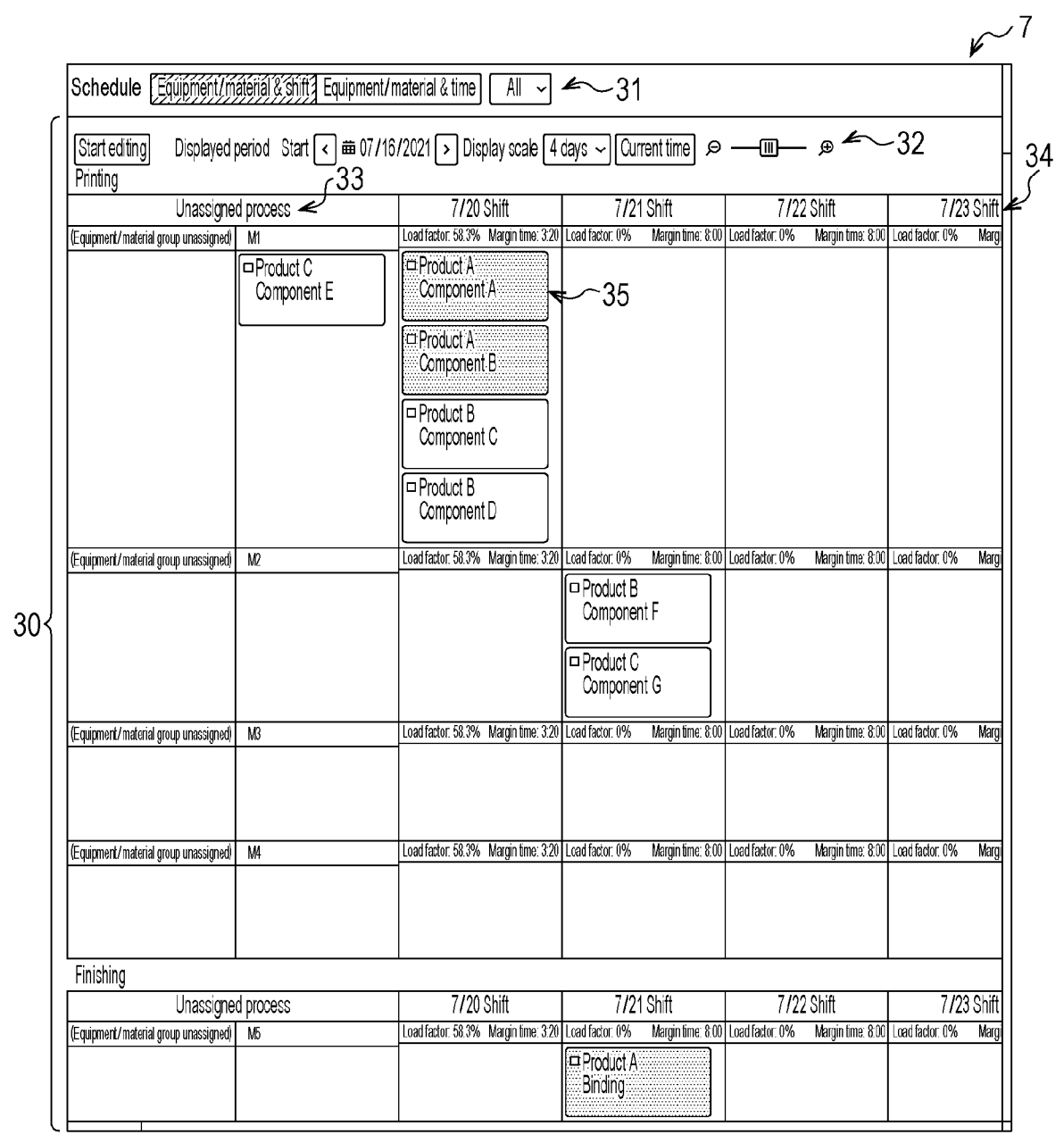

FIG. 13 is a view illustrating an example of displaying the schedule table displayed in the schedule setting area 30 illustrated in FIG. 10 in the automatic scale setting. Each highlighted job card 35 is displayed in the maximum size in the schedule setting area 30 without the user controlling the scale.

Supporting Schedule Setting on Schedule Setting Screen

In the case where the user sets a schedule for a job represented by a job card 35 on the schedule setting screen 7, the user performs the following operations, as has been described. The user drags the job card 35 displayed in the column of an unassigned process 33, drops the job card 35 into a date in the calendar 34, and thereby assigns the job represented by the dropped job card 35 to the date corresponding to the drop position of the job card 35.

The user needs to set the order of jobs in accordance with a predetermined flow of the manufacturing processes of a printed material. For example, it is not possible to perform a job for binding text-printed paper sheets before a job for printing the text.

As described above, there is a job period allowing a job to be performed for each job. Every time the user selects a job card 35, the CPU 21 thus displays the job period allowing the job represented by the selected job card 35 to be performed in the schedule setting area 30 after referring to the workflow of the printed material associated with the selected job card 35. Hereinafter, the job period allowing the job represented by the selected job card 35 to be performed is referred to as an assignable period.

Figure 14:
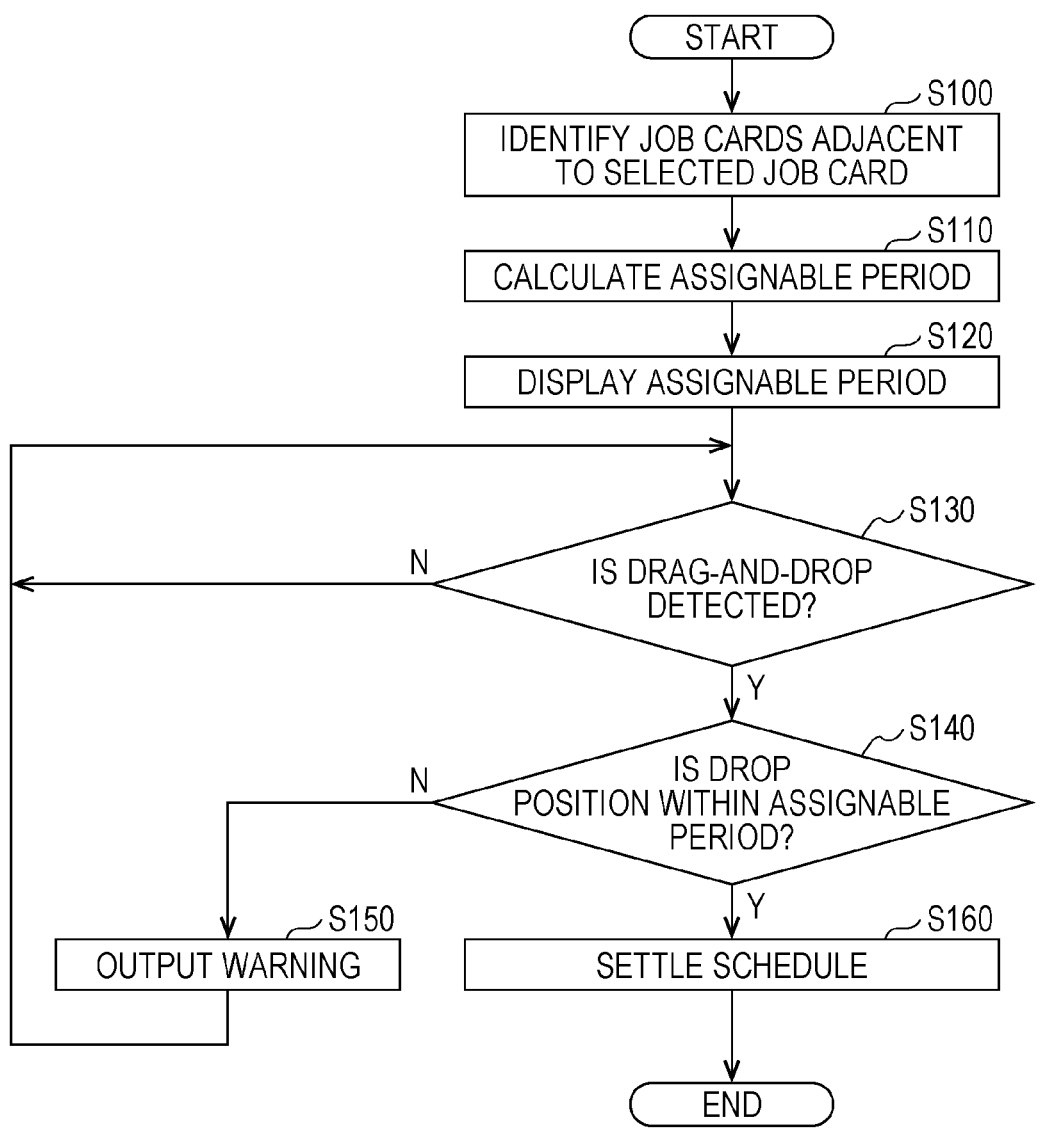
FIG. 14 is a flowchart illustrating an example of the flow of scheduling steps in the process management apparatus.

FIG. 14 is a flowchart illustrating an example of the flow of scheduling steps performed by the CPU 21 in the case where the user assigns a job to the manufacturing facility in the schedule setting area 30. The information processing program describing the scheduling steps is stored in advance, for example, in the ROM 22 of the process management apparatus 10. The CPU 21 of the process management apparatus 10 reads the information processing program stored in the ROM 22 and performs the scheduling steps.

The user selects one of the job cards 35 that is not assigned a job schedule. In step S100 in FIG. 14, the CPU 21 then refers to the workflow of the printed material associated with the selected job card 35 and identifies adjacent job cards 35 adjacent to the selected job card 35. For convenience of explanation, the adjacent job cards 35 each have been assigned a job schedule.

In step S110, the CPU 21 calculates a job assignable period represented by the selected job card 35. Specifically, of the manufacturing processes associated with the respective adjacent job cards 35, the CPU 21 sets a date when the previous process prior to the manufacturing process associated with the selected job card 35 ends, as the start of the assignable period, and sets a date when the subsequent process subsequent to the manufacturing process associated with the selected job card 35 starts, as the end of the assignable period. For example, if the finish date of the previous process is Jul. 21, 2021, and if the start date of the subsequent process is Jul. 22, 2021, a period from Jul. 21, 2021 to Jul. 22, 2021 is calculated as the job assignable period represented by the selected job card 35. The start time of the manufacturing process is referred to as a start of the manufacturing process, and the end time of the manufacturing process is referred to as an end of the manufacturing process. In the example in this exemplary embodiment, the calendar 34 is displayed by using a day as a unit, and thus the job represented by the job card 35 is assigned by using a day as the unit. The start of the manufacturing process and the end of the manufacturing process are thus represented by using a date. If the calendar 34 is displayed by using an hour as the unit, the start of the manufacturing process and the end of the manufacturing process are represented by using a date and time.

The CPU 21 may also set, as a job assignable period represented by the selected job card 35, a period from a date a predetermined number of days D1 after the finish date of the previous process to a date up to a predetermined number of days D2 before the start date of the subsequent process.

The CPU 21 naturally sets the job assignable period represented by the selected job card 35 such that the job assignable period is longer than or equal to working hours required to perform the job represented by the selected job card 35. Accordingly, if hours corresponding to the number of days from the finish date of the previous process prior to the manufacturing process associated with the selected job card 35 to the subsequent process subsequent to the start of the manufacturing process date is shorter than the working hours required to perform the job represented by the selected job card 35, the CPU 21 may output, to the user, a warning to change the schedule for at least one of the previous process and the subsequent process. Outputting the warning to the user denotes making the presence of the warning noticeable by the user. Displaying the warning in the schedule setting area 30 and vocally notifying the warning with the viewing machine 8 are each an example of outputting the warning.

In step S120, the CPU 21 displays the assignable period calculated in step S110 in the schedule setting area 30.

Figure 15:
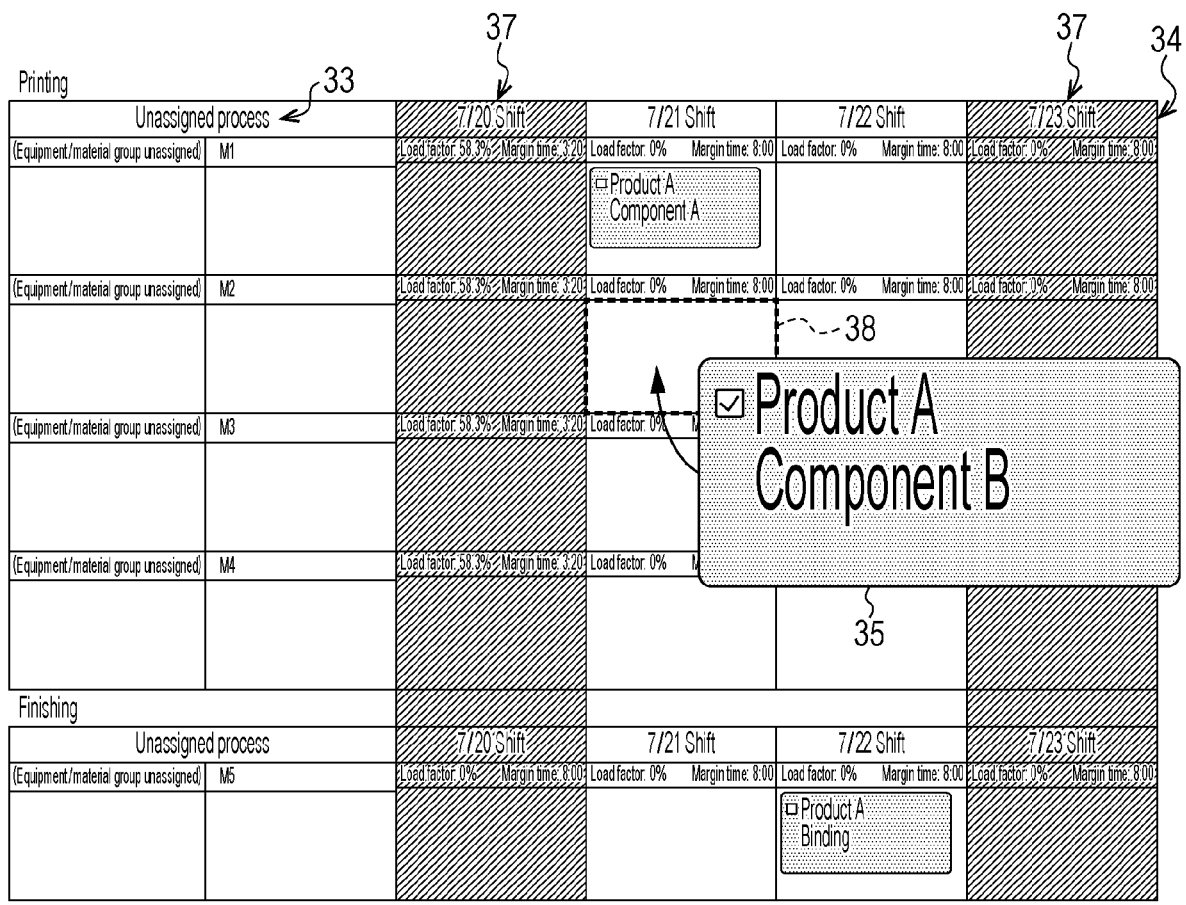
FIG. 15 is a view illustrating an example of displaying a job assignable period.

FIG. 15 is a view illustrating an example of displaying a job assignable period represented by the selected job card 35. As illustrated in FIG. 15, the CPU 21 highlights a job period not allowing the job represented by the selected job card 35 to be performed, as a job assignment prohibited period 37, for example, in the calendar 34 and thereby indicates the job assignable period represented by the selected job card 35. The CPU 21 may naturally highlight the job assignable period represented by the selected job card 35, for example, in the calendar 34.

In step S130 in FIG. 14, the CPU 21 determines whether the selected job card 35 is subjected to a drag-and-drop. If the selected job card 35 is not subjected to a drag-and-drop, the determination in step S130 is repeated until the drag-and-drop is performed. If it is determined that the selected job card 35 is subjected to a drag-and-drop, the processing proceeds to S140.

In step S140, the CPU 21 determines whether the selected job card 35 is dropped into a date within the assignable period displayed in the calendar 34. If the selected job card 35 is dropped into a date within the job assignment prohibited period 37, the processing proceeds to S150.

In this case, the CPU 21 may alert the user to assign the job represented by the selected job card 35 to a date within the assignable period.

In step S150, the CPU 21 thus outputs the warning to the user by displaying, for example, a message "Not possible to assign the job to the specified date" on the schedule setting screen 7. In response to this, the user receiving the warning again drags the job card 35 and drops the job card 35 into a date within the assignable period. The processing thus proceeds to S130, and the CPU 21 again determines whether the selected job card 35 is subjected to a drag-and-drop.

The CPU 21 repeats steps S130 to S150 until the selected job card 35 is dropped into a date within the assignable period displayed in the calendar 34.

In contrast, if the user drags and drops the job card 35 into an area 38 in FIG. 15, it is determined in the determination in step S140 that the selected job card 35 is dropped into a date within the assignable period displayed in the calendar 34, and thus the processing proceeds to S160.

In step S160, the CPU 21 settles the schedule such that the job represented by the dropped job card 35 is performed with the manufacturing facility associated with the drop position of the job card 35 on the date corresponding to the drop position of the job card 35.

The scheduling steps illustrated in FIG. 14 is then terminated.

The example in which the unit of the period displayed in the calendar 34 is a day has heretofore been described; however, the CPU 21 may display the period after changing the unit of the period to be displayed in the calendar 34 to a specified period in accordance with an instruction from the user, such as 30 minutes, one hour, six hours, or a week. In this case, the CPU 21 displays the assignable period in the schedule setting area 30 on the basis of the unit of the period to be displayed in the calendar 34.

If the unit of the period to be displayed in the calendar 34 is, for example, an hour, a job may be assigned to a manufacturing facility by using an hour as the unit. If the unit of the period to be displayed in the calendar 34 is an hour, the load factor and the margin time displayed in the calendar 34 are displayed by using an hour as the unit. Note that assigning a job by using an hour as the unit denotes assigning a job to a one hour period, for example, from 10:00 to 11:00 a.m. on July 21. If the assigned job is not to be finished within one hour, the job is also assigned to a subsequent period resulting from the division using an hour as the unit.

The process management apparatus 10 does not necessarily have to display the schedule setting screen 7 on the viewing machine 8. If the user is present in a place where the user is able to touch the process management apparatus 10, the schedule setting screen 7 may be displayed on the display unit 29. Whether to display the schedule setting screen 7 on the viewing machine 8 or on the process management apparatus 10 depends on the setting by the user.

An aspect of the process management apparatus 10 has been described by using the exemplary embodiment. However, the form as the process management apparatus 10 is an example, and the scope thereof is not limited to the scope of the described exemplary embodiment. Various modifications or improvements may be made to the exemplary embodiment described above without departing from the spirit of the disclosure. An exemplary embodiment to which the modification or the improvement is made may also be included in the technical scope of the present disclosure. For example, the order of the displaying steps illustrated in FIGS. 4, 6, and 7 and the scheduling steps illustrated in FIG. 14 may be changed without departing from the spirit of the disclosure.

In the exemplary embodiment above, the case where the displaying steps and the scheduling steps are implemented by software has been described as an example. However, steps equivalent to the displaying steps illustrated in FIGS. 4, 6, and 7 and the scheduling steps illustrated in FIG. 14 may be performed by hardware. In this case, the displaying steps and the scheduling steps are processed more quickly than in the case of the implementation by the software.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

In the exemplary embodiment, the example in which the ROM 22 stores the information processing program; however, the storage place of the information processing program is not limited to the ROM 22. The information processing program of the present disclosure may also be provided in such a manner as to be recorded in a computer-readable storage medium. For example, the information processing program may be provided in such a manner as to be recorded in an optical disk such as a compact disc (CD)-ROM or a digital versatile disc (DVD)-ROM. The information processing program may also be provided in such a manner as to be recorded in a portable semiconductor memory such as a universal serial bus (USB) memory or a flash memory.

The ROM 22, the nonvolatile memory 24, the CD-ROM, the DVD-ROM, the USB memory, and the memory card are each an example of a non-transitory storage medium.

Further, the process management apparatus 10 may download the information processing program from a memory device connected to the communication unit 27 via the communication network 3 and store the downloaded information processing program in the non-transitory storage medium. In this case, from the non-transitory storage medium, the CPU 21 of the process management apparatus 10 reads the information processing program downloaded from the memory device and performs the displaying steps and the scheduling steps.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
    display a schedule setting area which shows schedules of each manufacturing facility by displaying a plurality of job cards representing details of an assigned job of each of the manufacturing facility,
    associate job cards representing jobs of manufacturing a same product among the plurality of job cards,
    when a job card is selected from the plurality of job cards, display the selected job card and job cards associated to the selected job card differently from other job cards that are not associated with the selected job card.

2. The information processing apparatus according to claim 1,
wherein the processor is configured to:
    in response to the selection of the selected job card, display a workflow chart, which includes a job represented by the selected job card, representing flow of a manufacturing product, the workflow chart being displayed in a workflow display area displayed together with the schedule setting area.

3. The information processing apparatus according to claim 2,
wherein the processor is configured to:
display the job represented by the selected job card and jobs represented by job cards associated with the selected job card in the workflow display area in a form differentiated from a form for jobs represented by job cards which are not associated with the selected job card.

4. The information processing apparatus according to claim 2,
wherein the processor is configured to:
in response to selection of one of the jobs displayed in the workflow display area display, in the schedule setting area, a job card representing the job selected in the workflow display area in a form differentiated from a form for a job card representing an unselected job.

5. The information processing apparatus according to claim 1,
wherein the job cards not associated with the selected job card are job cards representing jobs which produce a different product from a product produced by the job represented by the selected job card.

6. The information processing apparatus according to claim 2,
wherein the job cards not associated with the selected job card are job cards representing jobs which produce a different product from a product produced by the job represented by the selected job card.

7. The information processing apparatus according to claim 3,
wherein the job cards not associated with the selected job card are job cards representing jobs which produce a different product from a product produced by the job represented by the selected job card.

8. The information processing apparatus according to claim 4,
wherein the job cards not associated with the selected job card are job cards representing jobs which produce a different product from a product produced by the job represented by the selected job card.

9. The information processing apparatus according to claim 5,
wherein the processor is configured to:
display the selected job card and adjacent job cards that are included in the plurality of job cards displayed in the schedule setting area and represent details of respective jobs to be performed immediately before and immediately after the job represented by the selected job card, the selected job card and the adjacent job cards being each displayed in the form differentiated from the form for the job cards representing the jobs which produce the different product.

10. The information processing apparatus according to claim 6,
wherein the processor is configured to:
display the selected job card and adjacent job cards that are included in the plurality of job cards displayed in the schedule setting area and represent details of respective jobs to be performed immediately before and immediately after the job represented by the selected job card, the selected job card and the adjacent job cards being each displayed in the form differentiated from the form for the job cards representing the jobs which produce the different product.

11. The information processing apparatus according to claim 7,
wherein the processor is configured to:
display the selected job card and adjacent job cards that are included in the plurality of job cards displayed in the schedule setting area and represent details of respective jobs to be performed immediately before and immediately after the job represented by the selected job card, the selected job card and the adjacent job cards being each displayed in the form differentiated from the form for the job cards representing the jobs which produce the different product.

12. The information processing apparatus according to claim 5,
wherein the processor is configured to:
set a scale for the job cards to be displayed in the schedule setting area, the scale being set to display each job card within the schedule setting area, in a maximum size, and in the form differentiated from the form for the job card representing the jobs producing the different product.

13. The information processing apparatus according to claim 1,
wherein the processor is configured to:
display, in the schedule setting area, a job period allowing the job represented by the selected job card to be performed.

14. The information processing apparatus according to claim 13,
wherein the processor is configured to: display the job period in the schedule setting area by using a predetermined period as a unit.

15. The information processing apparatus according to claim 13,
wherein the processor is configured to: set, as a start of the job period, an end of a job to be performed immediately before the job, represented by the selected job card, producing the product, and set, as an end of the job period, a start of a job to be performed immediately after the job, represented by the selected job card, producing the product.

16. The information processing apparatus according to claim 13,
wherein the processor is configured to: in response to setting the selected job card to be performed in a period other than the job period, output a warning.

17. The information processing apparatus according to claim 1,
wherein the processor is configured to: display a job period not allowing the job represented by the selected job card to be performed in the schedule setting area.

18. An information processing method comprising:
displaying a schedule setting area which shows schedules of each manufacturing facility by displaying a plurality of job cards representing details of an assigned job of each of the manufacturing facility;
associating job cards representing jobs of manufacturing a same product among the plurality of job cards;
selecting a job card from the plurality of job cards; and
after the job card is selected from the plurality of job cards, displaying the selected job card and job cards associated to the selected job card differently from other job cards that are not associated with the selected job card.

19. A non-transitory computer readable medium storing a program causing a computer to execute a process for information processing, the process comprising:
displaying a schedule setting area which shows schedules of each manufacturing facility by displaying a plurality of job cards representing details of an assigned job of each of the manufacturing facility;

associating job cards representing jobs of manufacturing a same product among the plurality of job cards;

selecting a job card from the plurality of job cards; and after the job card is selected from the plurality of job cards, displaying the selected job card and job cards associated to the selected job card differently from other job cards that are not associated with the selected job card.

* * * * *